L. D. PITCHER.
Hay and Manure Forks.
No. 5,279. Reissued Feb. 11. 1873.
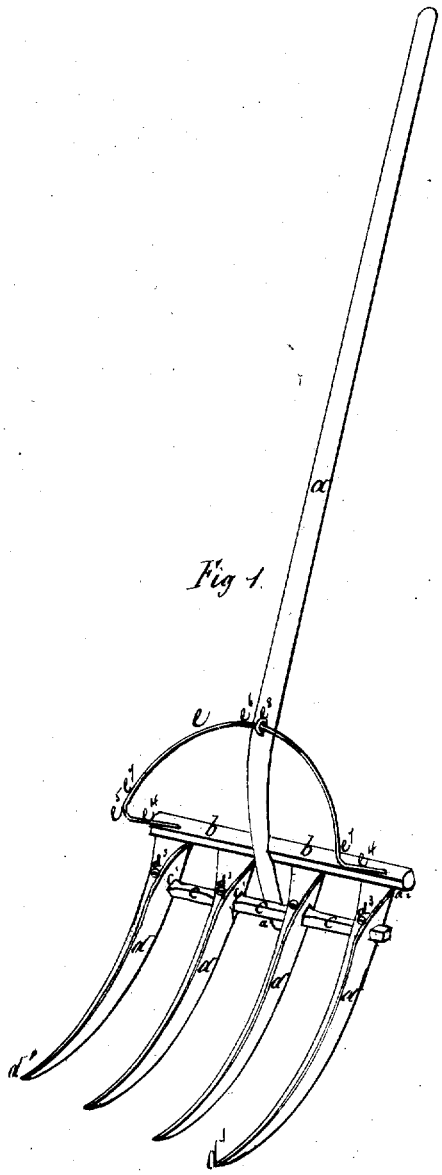
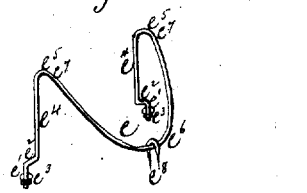
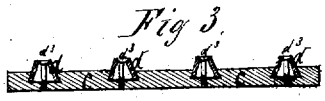
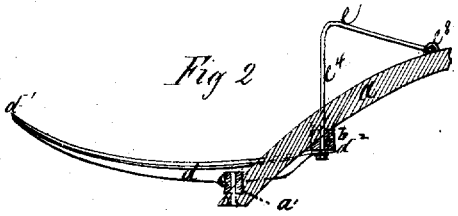
Witnesses.
J. Mason Goozler
Geo. H. Howard
Inventor
Lester Delos Pitcher
by Colburn Brooks & Co
his attorneys
AM. PHOTO-LITHOGRAPHIC CO. N.Y. (OSBORNE'S PROCESS.)

UNITED STATES PATENT OFFICE.

LESTER D. PITCHER, OF DIXON, ILLINOIS.

IMPROVEMENT IN HAY AND MANURE FORKS.

Specification forming part of Letters Patent No. 90,463, dated May 25, 1869; reissue No. 5,279, dated February 11, 1873.

*To all whom it may concern:*

Be it known that I, LESTER DELOS PITCHER, of Dixon, in the county of Lee and State of Illinois, have invented certain Improvements in Hay and Manure Forks, of which the following is a specification:

This invention relates, first, to improvements in the mode of applying the tines of "hay and manure forks" to the handles, whereby such tines may be held more securely in position and more readily replaced when worn or damaged.

In carrying out the first part of my invention I apply a cross-bar to the fork, which is provided with dovetailed mortises adapted to receive the tines, which are formed of sheet metal and V-shaped in section from their points to their upper ends, where they are fastened to the cross-head. The upper ends of the tines are flattened out so as to be capable of being firmly secured to the under side of the cross-head.

The second part of my invention relates to improvements in the "bail" of such forks, whereby short straw or other matter which could not otherwise be held on the tines alone may be lifted with ease, while at the same time the bail is so constructed that it will allow of the forks being closely packed together for shipment or transportation without necessitating the removal or folding of the bail.

Figure 1 represents a perspective view of a hay and manure fork constructed according to my invention. Fig. 2 is a vertical transverse section of a portion of the same. Fig. 3 is a longitudinal section. Fig. 4 is a perspective view of the bail separately.

In each of these views the same letters of reference are employed to indicate corresponding parts.

*a* represents the handle, which is formed straight at its upper part, while its lower end is bent so as to pass over the cross-head *b*, which is notched to receive the same, and under the cross-bar *c*, and has a notch, $a'$, formed therein for the reception of the cross-bar *c*. *d d* are the tines, four of which are shown in the drawing, but other number may be employed. The tines *d* are formed of sheet metal, by stamping or other suitable means, and of an inverted V-shape in cross-section from the tip or point $d^1$ to the upper end $d^2$, where they are screwed or otherwise fastened to the cross-head *b*, so that when the tines are in position, as shown in Figs. 1 and 2, they are ridge-shaped on their upper surface and are consequently grooved on their under sides. The tines *d* at $d^2$ are flattened out so as to be capable of being more securely fastened to the under side of the cross-head *b*. $d^3$ $d^3$ are screws, of which there are three, by preference, to each tine, and by which the tines are held securely in position. The cross-bar *c* at its upper surface is provided with dovetail mortises $c'$ formed narrower at the top and arranged each to receive and hold one of the tines *d*, such tines being inserted by passing their points through first and then pressing the cross-bar down over such tines until, by their gradually-increasing diameter, the tines are firmly held in position, where they are retained by the screws $d^3$. *e* represents my improved bail, which is, by preference, formed of iron or steel wire so arranged that the bearings $e^1$ $e^1$ may be received and held in position by the cross-head *b*, while the wire at $e^2$ is so bent as to form a shoulder which serves as a stop, in order that the bearings $e^1$ may be firmly screwed down by means of a nut and washer, $e^3$; or it may be riveted firmly in position, if preferred, without a nut. The uprights or standards $e^4$ of the bail *e* are formed straight for a considerable distance, and at right angles to the cross-head *b*. They then are bent over, as shown at $e^5$, to support the back $e^6$ of the bail, which is curved downward toward the handle *a* as well as round from the point $e^7$ of one of the uprights $e^4$ to the point $e^7$ of the opposite upright. $e^8$ is a loop or staple, or it may be a screw-ring or other means by which the back $e^6$ of the bail *e* is secured to the handle *a*. The ends of the bail may be taken through the tines and supply the place of two of the screws $d^3$.

In the event of any of the tines becoming broken or damaged they can be easily replaced by new ones by removing the screws $d^3$ and withdrawing the damaged ones.

Having thus described my invention, I would have it understood that what I claim, and desire to secure by Letters Patent, is—

1. Hay and manure forks consisting of sheet-metal tines *d* fitted over and supported by the cross-bar *c* and under the cross-head *b*, and having handle *a* fitted over the cross-head *b* and under the cross-bar *c*, in the manner and for the purposes substantially as herein shown and described.

2. The bail *e*, constructed with bearings $e^1$ $e^1$, shoulders $e^2$ $e^2$, standards $e^4$ $e^4$, curved portions $e^5$, and a back, $e^6$, in combination with the handle *a* and cross-head *b* of a hay and manure fork, in the manner and for the purposes shown and described.

LESTER D. PITCHER.

Witnesses:
P. M. ALEXANDER,
F. S. HOWELL.